(12) United States Patent
Toda

(10) Patent No.: US 8,368,940 B2
(45) Date of Patent: Feb. 5, 2013

(54) SYSTEM, METHOD, AND APPARATUS FOR PRINTING DIGITAL IMAGE, AND COMPUTER PRODUCT

(75) Inventor: Katsuyuki Toda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1162 days.

(21) Appl. No.: 11/340,698

(22) Filed: Jan. 27, 2006

(65) Prior Publication Data

US 2006/0182480 A1 Aug. 17, 2006

(30) Foreign Application Priority Data

Jan. 28, 2005 (JP) ................................. 2005-020978

(51) Int. Cl.
*G06K 15/00* (2006.01)
*G03G 15/00* (2006.01)
(52) U.S. Cl. ..................... 358/1.18; 358/1.15; 358/1.16; 358/1.12; 399/23; 382/305
(58) Field of Classification Search .................. 358/1.9; 400/62
See application file for complete search history.

(56) References Cited

U.S. PATENT DOCUMENTS

| | | | | | |
|---|---|---|---|---|---|
| 5,550,623 | A | * | 8/1996 | Tomita et al. | 399/83 |
| 5,940,543 | A | * | 8/1999 | Isemura et al. | 382/284 |
| 6,356,719 | B1 | * | 3/2002 | Yoshiura | 399/45 |
| 6,945,716 | B2 | * | 9/2005 | Kawamoto | 400/62 |
| 7,038,714 | B1 | * | 5/2006 | Parulski et al. | 348/207.2 |
| 2002/0030856 | A1 | * | 3/2002 | Kumagai | 358/1.18 |
| 2003/0107169 | A1 | * | 6/2003 | Rider | 271/225 |
| 2003/0122932 | A1 | * | 7/2003 | Shiohara | 348/207.2 |
| 2003/0161641 | A1 | * | 8/2003 | Edmonds | 399/23 |
| 2003/0197882 | A1 | * | 10/2003 | Tsukuba et al. | 358/1.12 |
| 2003/0231359 | A1 | * | 12/2003 | Hayashi et al. | 358/498 |
| 2004/0012814 | A1 | * | 1/2004 | Tanaka et al. | 358/1.18 |
| 2005/0007617 | A1 | * | 1/2005 | Tanaka et al. | 358/1.13 |
| 2005/0013642 | A1 | * | 1/2005 | Kawamoto | 400/62 |
| 2005/0068584 | A1 | * | 3/2005 | Kawaoka | 358/1.18 |
| 2005/0270574 | A1 | * | 12/2005 | Saito et al. | 358/1.15 |
| 2006/0182480 | A1 | * | 8/2006 | Toda | 400/62 |

FOREIGN PATENT DOCUMENTS

| | | |
|---|---|---|
| JP | 10-129072 | 5/1998 |
| JP | 11-255358 | 9/1999 |
| JP | 2002-77526 | 3/2002 |
| JP | 2004-064740 | 2/2004 |
| JP | 2005-020305 | 1/2005 |

OTHER PUBLICATIONS

Photolighting http://web.archive.org/web/20040214090435/http://www.photolightning.com/photo-printing-software.html (Feb. 14, 2004).*
Office Action for corresponding Japanese patent application No. 2005-020978 dated Mar. 16, 2010.

* cited by examiner

*Primary Examiner* — Kimberly A Williams
*Assistant Examiner* — Huo Long Chen
(74) *Attorney, Agent, or Firm* — Harness, Dickey & Pierce, P.L.C.

(57) ABSTRACT

Upon reception of information on a paper size, an index print command, and at least one piece of digital image data from an external device, a printing apparatus acquires an image layout mode corresponding to the paper size from an index layout information table, selects a tray of a paper feeding unit corresponding to the paper size, and outputs an index image including an image of the image data arranged on a sheet of paper, based in acquired image layout mode.

10 Claims, 12 Drawing Sheets

PRINT JOB INFORMATION; INDEX PRINTING

IMAGE DATA

FIG. 7

| PAPER SIZE | NUMBER OF VERTICAL FRAMES | NUMBER OF HORIZONTAL FRAMES | PAPER ORIENTATION |
|---|---|---|---|
| A4 | 6 | 5 | VERTICAL |
| A4 | 5 | 6 | HORIZONTAL |
| A3 | 10 | 6 | VERTICAL |
| A3 | 6 | 10 | HORIZONTAL |
| B4 | 8 | 6 | VERTICAL |
| B4 | 6 | 8 | HORIZONTAL |

INDEX LAYOUT INFORMATION TABLE

PAPER SIZE: A4/PAPER ORIENTATION: HORIZONTAL

PAPER SIZE: A4/PAPER ORIENTATION: VERTICAL

SYSTEM, METHOD, AND APPARATUS FOR PRINTING DIGITAL IMAGE, AND COMPUTER PRODUCT

CROSS-REFERENCE TO RELATED APPLICATIONS

The present document incorporates by reference the entire contents of Japanese priority document, 2005-020978 filed in Japan on Jan. 28, 2005.

BACKGROUND OF THE INVENTION

1. Field of the Invention

The present invention relates to a technology for printing a digital image.

2. Description of the Related Art

There are conventional digital still cameras that can store shot digital images on a storage medium, and exchange data with an external device connected thereto. When printing shot digital images on a paper medium, the digital still cameras temporarily send the digital images stored on the storage medium to an external data device, such as a personal computer. The digital images are, then, output to a printing apparatus using an edit and print function (application) of the external data device.

Alternatively, a user takes out the storage medium from the digital still camera, and takes the storage medium to a development, printing, enlargement (DPE) shop where digital images stored on the storage medium are printed out, or the user prints the digital images using a printer for a digital still camera sited at the shop.

Since printing digital images shot by a digital still camera requires an external storage device or the like, printing is not handy.

There are practical printing apparatuses including a function of exchanging data with a digital still camera connected thereto, and printing image data received from the digital still camera.

Such a function of the printing apparatuses is called a "direct print function".

Digital images shot by a digital still camera can be printed easily by using the printing apparatus including the direct print function.

However, the user uses the direct print function by using a display unit and an operation unit provided on the digital still camera. This lowers the degree of freedom of printing, such as the layout, and can provide only relatively simple prints as compared with printing performed by using the external data device.

There is a system that enhances the compatibility on a print job among devices manufactured by different makers by sending device print information included in a printer when a printer is connected to a digital still camera (Japanese Patent Application Laid-Open No. 2004-64740).

Although the above system sends a paper size as print information, the system does not send information on an orientation of the paper set on a paper feed tray.

In a printing apparatus including more than one paper feed tray, when sheets of paper of the same size are stored on the paper feed trays in a vertical orientation, which is a mode of feeding the sheets of paper in a direction orthogonal to the short side of the paper (vertically elongated direction), and in a horizontal orientation, which is a mode of feeding the sheets of paper in a direction orthogonal to the long side of the paper (horizontally elongated direction), the digital still camera is informed of print information lacking information on the paper orientation. Accordingly, information on the paper orientation is not informed to the printing apparatus, therefore, the printing apparatus processes job information only on the paper size, requiring determination on from which paper feed tray, the sheets of paper should be fed.

In this case, if a control or a drawing process involving paper feeding from the paper feed tray of which feeding direction is fixed to a direction to feed a sheet in a vertical orientation is performed, when sheets of paper of a horizontal orientation are stored and sheets of paper of a vertical orientation are not stored on the paper feed tray, printing for sheets of paper of the horizontal orientation may not be performed even though the papers are stored in the proper direction. If printing is forcibly performed on the sheets of paper of the horizontal orientation with the layout of the sheets of paper of the vertical orientation, images to be printed out on a sheet are partly missing.

SUMMARY OF THE INVENTION

It is an object of the present invention to at least solve the problems in the conventional technology.

A digital-image printing system according to one aspect of the present invention includes an external device configured to store digital image data; a printing apparatus configured to print image data received from the external device on paper. The external device is configured to transmit information on a paper size, an index print command, and at least one piece of digital image data to the printing apparatus. The printing apparatus includes a paper feeding unit that includes a plurality of trays in which sheets of paper are stored, a receiving unit configured to receive the information on a paper size, the index print command, and the digital image data from the storage unit, an index layout table in which an image layout mode is stored, the image layout mode corresponding to each paper size and each paper orientation, an acquiring unit configured to acquire, from the index layout table, an image layout mode corresponding to the paper size in received information, and a selecting unit configured to select a tray, from among the trays, a tray storing paper of the paper size in the received information. The printing apparatus is configured to output, when the receiving unit receives the index print command, an index image having an image in received digital image data on paper in selected tray, based on acquired layout mode.

A printing apparatus according to another aspect of the present invention has a function of communicating data with an external device connected thereto, and prints image data received from the external device. The printing apparatus includes a paper feeding unit that includes a plurality of trays in which sheets of paper are stored; a receiving unit configured to receive information on a paper size, an index print command, and at least one piece of digital image data from the external device; an index layout table in which an image layout mode is stored, the image layout mode corresponding to each paper size and each paper orientation; an acquiring unit configured to acquire, from the index layout table, an image layout mode corresponding to the paper size in received information; and a selecting unit configured to select a tray, from among the trays, a tray storing paper of the paper size in the received information. The printing apparatus is configured to output, when the receiving unit receives the index print command, an index image having an image in received digital image data on paper in selected tray, based on acquired layout mode.

A control method according to still another aspect of the present invention is a method of controlling a digital-image printing system in which an external device configured that store digital image data is connected to a printing apparatus that prints image data received from the external device on paper, the external device and the printing apparatus communicating data therebetween. The control method includes transmitting information on a paper size, an index print command, and at least one piece of digital image data from the external device to the printing apparatus; storing paper in a plurality of trays; receiving the information on a paper size, the index print command, and the digital image data from the storage unit with the printing apparatus; storing an index layout table in which an image layout mode is stored, the image layout mode corresponding to each paper size and each paper orientation; acquiring, from the index layout table, an image layout mode corresponding to the paper size in received information; selecting a tray, from among the trays, a tray storing paper of the paper size in the received information; and outputting, when the index print command is received at the receiving, an index image having an image in received digital image data on paper in selected tray, based on acquired layout mode.

A computer-readable recording medium according to still another aspect of the present invention stores therein a computer program for realizing a control method according to the above aspect.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 7 is a table of index layout information;

DETAILED DESCRIPTION OF THE PREFERRED EMBODIMENTS

Exemplary embodiments according to the present invention are explained in detail below with reference to the accompanying drawings.

Figure 1A:
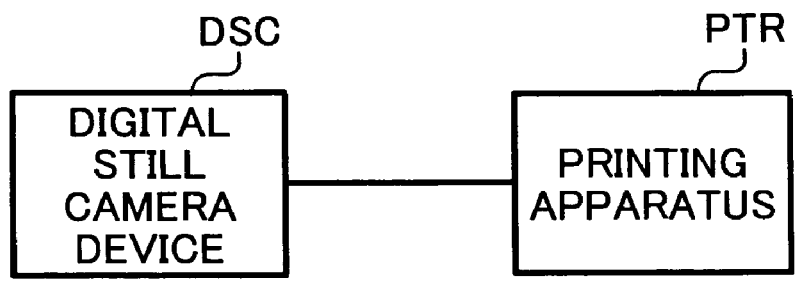
FIGS. 1A and 1B are block diagrams of a digital still camera printing system according to one embodiment of the present invention.

FIG. 1A illustrates one example of a digital still camera printing system according to one embodiment of the present invention. In the example, a digital still camera device DSC is connected as an external device of a printing apparatus PTR.

As shown in FIG. 1A, the digital still camera device DSC has functions of saving shot digital image data in a memory medium (storage medium) to be described later, connecting to the printing apparatus PTR, and transferring a size of print paper, an image layout, and one or more pieces of selected image data to the printing apparatus PTR according to a predetermined communication procedure.

Upon reception of the paper size, the image layout, and one or more pieces of image data from the digital still camera device DSC, the printing apparatus PTR selects a tray for feeding sheets of paper according to the paper size and the image layout, and prints out an image or images of the received image data on paper fed from the selected tray.

The digital still camera device DSC includes an external communication unit that connects to an external device such as the printing apparatus PTR to exchange data therewith. The external communication unit is a general-purpose communication unit of, for example, a universal serial bus (USB) type.

Figure 1B:
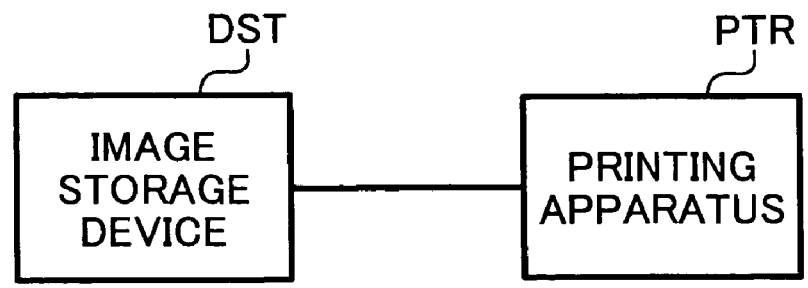

As shown in FIG. 1B, an image storage device DST in place of the digital still camera device DSC can be connected to the printing apparatus PTR, so that images stored in the image storage device DST are printed out by the printing apparatus PTR.

Accordingly, the image storage device DST has functions of connecting to the printing apparatus PTR, and transferring a size of print paper, an image layout, and one or more pieces of selected image data to the printing apparatus PTR according to a predetermined communication procedure.

Figure 2:
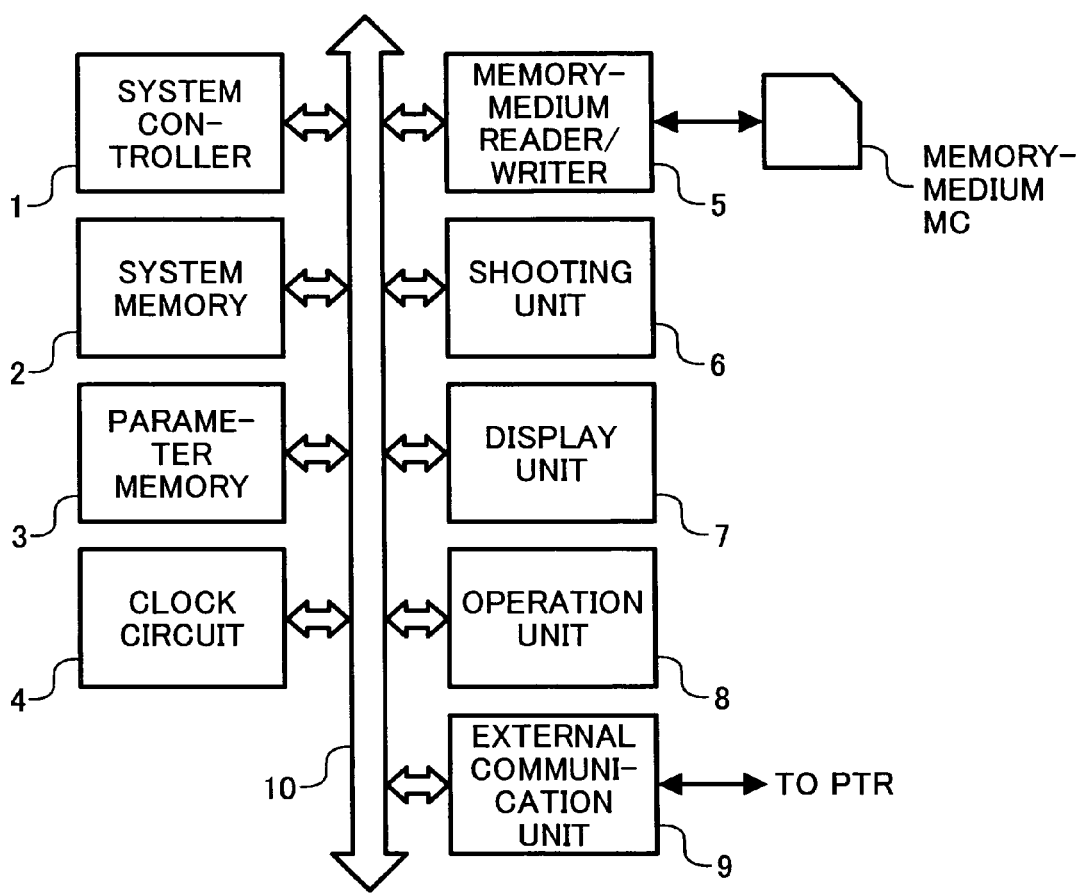
FIG. 2 is a block diagram of a digital still camera device DSC.

FIG. 2 is a block diagram of the digital still camera device DSC. As shown in FIG. 2, a system controller 1 controls the operations of the individual units of the digital still camera device DSC, reading and writing of data from and to a memory medium MC, shooting, and communications with an external device via the external communication unit, and performs various kinds of data processing, such as various user interface processes, when a user operates the digital still camera device DSC. A system memory 2 stores various control programs to be run by the system controller 1, and provides a work area for the system controller 1. A parameter memory 3 stores various kinds of information unique to the digital still camera device DSC. A clock circuit 4 outputs present time information or the like.

A memory-medium reader/writer 5 to and from which the memory medium MC is attached and detached reads and writes data from and to the mounted memory medium MC. A shooting unit 6 includes a camera mechanism, an optical system, and a photoelectric conversion unit all associated with camera shooting. A display unit 7, which can include, for example, a liquid crystal display, displays various kinds of information for the user. An operation unit 8 includes various keys or the like, and is used by the user to operate the digital still camera device DSC.

An external communication unit 9 is a general-purpose communication unit of, for example, a USB type. The external communication unit 9 connects to the external device, such as the printing apparatus PTR or the image storage device DST, and exchanges data with the external device.

The system controller 1, the system memory 2, the parameter memory 3, the clock circuit 4, the memory-medium reader/writer 5, the shooting unit 6, the display unit 7, the operation unit 8, and the external communication unit 9 are connected to an internal bus 10 mainly through which data exchange among the above components is executed.

Figure 3:
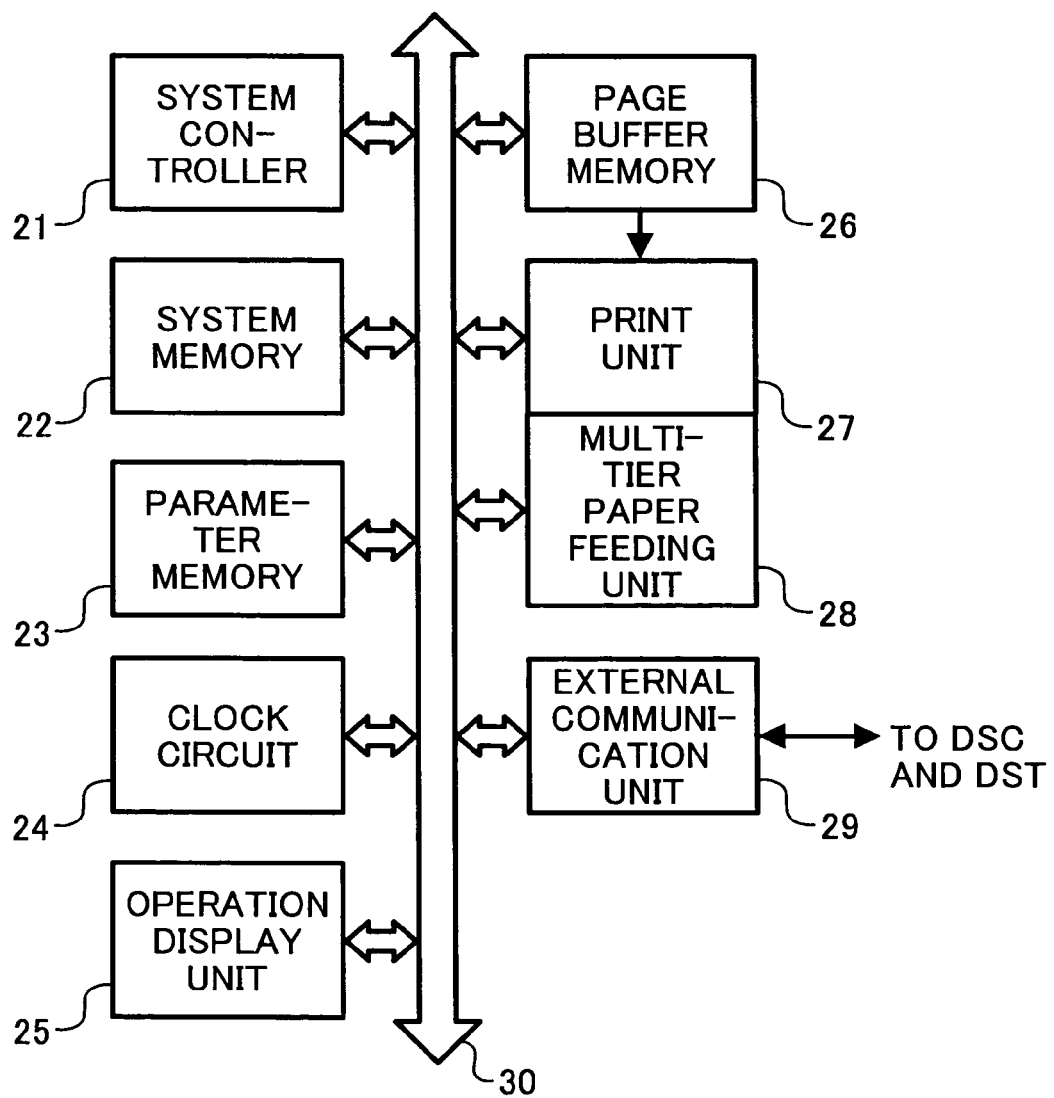
FIG. 3 is a block diagram of a printing apparatus PTR.

FIG. 3 illustrates one example of the configuration of the printing apparatus PTR. The printing apparatus PTR has a multi-tier paper feeding unit having a plurality of trays for storing sheets of paper.

As shown in FIG. 3, a system controller 21 controls the operations of the individual units of the printing apparatus PTR, paper feeding, printing, and communications with the external device via the external communication unit, and performs various kinds of data processing, such as various user interface processes, when the user operates the printing apparatus PTR. A system memory 22 stores various control programs to be run by the system controller 21, and provides a work area for the system controller 21. A parameter memory 23 stores various kinds of information unique to the printing apparatus PTR. A clock circuit 24 outputs present time information or the like. An operation display unit 25 constitutes a user interface for the user to operate the printing apparatus PTR.

A page buffer memory 26 constitutes a frame memory that saves one page of print data. A print unit 27 reads print data from the frame memory constituted by the page buffer memory 26, and prints an image on paper. The print unit 27 includes a multi-tier paper feeding unit 28 having a plurality of trays for storing sheets of paper. Accordingly, it is possible to adequately select one type of paper from plural types of paper, and use the selected paper as recording paper to be used by the print unit 27. Paper types to be stored in the trays include A4 portrait paper, A4 landscape paper, B5 portrait paper, B5 landscape paper, and A3 portrait paper.

An external communication unit 29 is a general-purpose communication unit of, for example, a USB type. The external communication unit 29 connects to the external device such as the digital still camera device DSC or the image storage device DST, and exchanges data with the external device.

The system controller 21, the system memory 22, the parameter memory 23, the clock circuit 24, the operation display unit 25, the page buffer memory 26, the print unit 27, the multi-tier paper feeding unit 28, and the external communication unit 29 are connected to an internal bus 30 mainly through which data exchange among the above components is executed.

Figure 4:
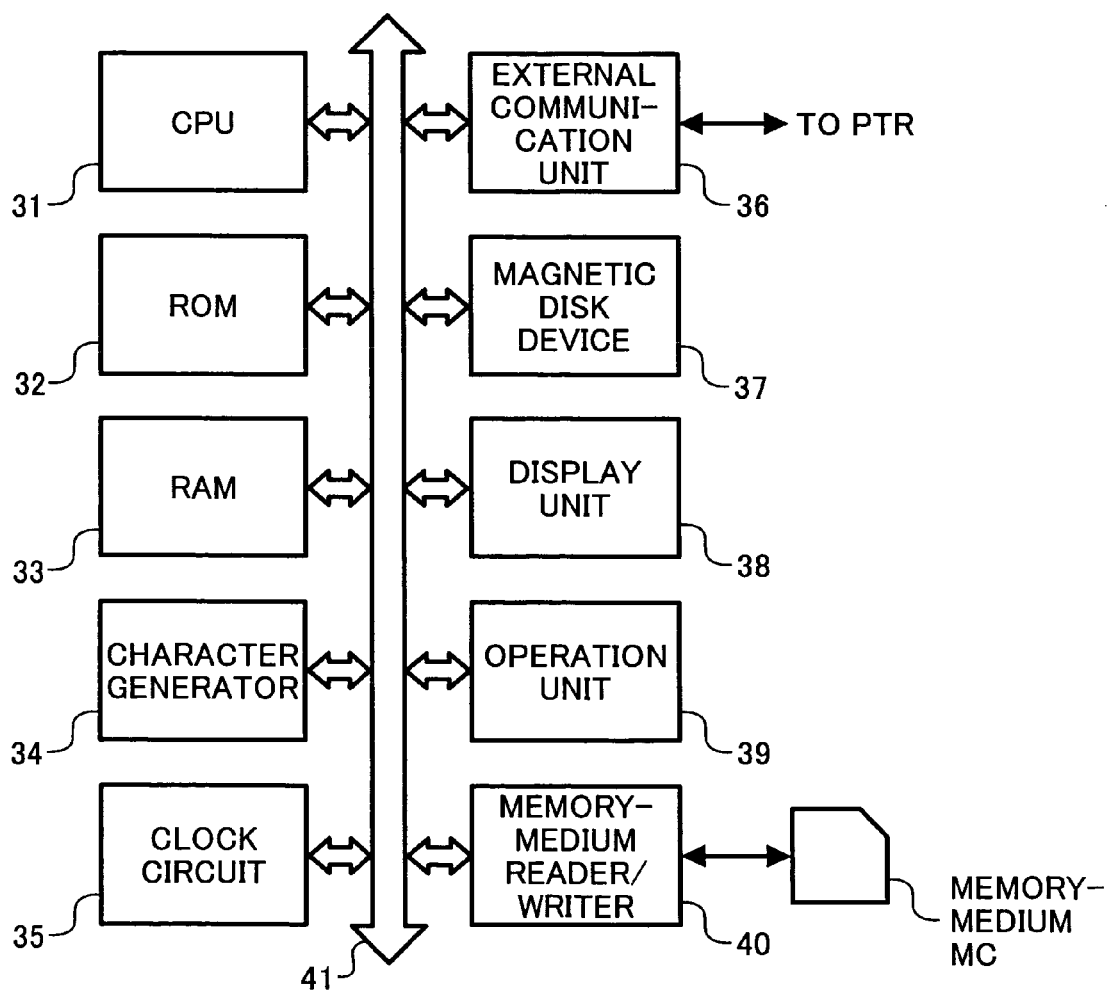
FIG. 4 is a block diagram of an image storage device DST.

FIG. 4 illustrates one example of the configuration of the image storage device DST. The image storage device DST can acquire plural pieces of image data stored in a memory medium, store the image data, display the stored image data, and transfer the stored image data to the external device.

A central processing unit (CPU) 31 controls the operation of the image storage device DST, a read only memory (ROM) 32 stores a program run by the CPU 31 at the time of activation, necessary data, or the like, and a random access memory (RAM) 33 provides a work area for the CPU 31.

A character generator 34 generates display data of graphic characters. A clock circuit 35 outputs present date and time information. An external communication unit 36 is a general-purpose communication unit of, for example, a USB type, and connects the image storage device DST to the external device such as the printing apparatus PTR.

A magnetic disk device 37 stores various kinds of data such as plural pieces of image data. A display unit 38, which can include, for example, a liquid crystal display, displays various kinds of information for the user. An operation unit 39 includes various keys or the like, and is used by the user to operate the image storage device DST. A memory-medium reader/writer 40 to and from which the memory medium MC is attached and detached reads and writes data from and to the mounted memory medium MC.

The CPU 31, the ROM 32, the RAM 33, the character generator 34, the clock circuit 35, the external communication unit 36, the display unit 38, the operation unit 39, and the memory-medium reader/writer 40 are connected to an internal bus 41 mainly through which data exchange among the above components is executed.

There are mobile communication terminal devices ("cellular phone" or the like) put to practical use, which have the functions of the digital still camera device DSC or the image storage device DST. Such a mobile communication terminal device or a digital video camera device having digital still camera functions can be used in place of the digital still camera device DSC or the image storage device DST.

Figure 5:
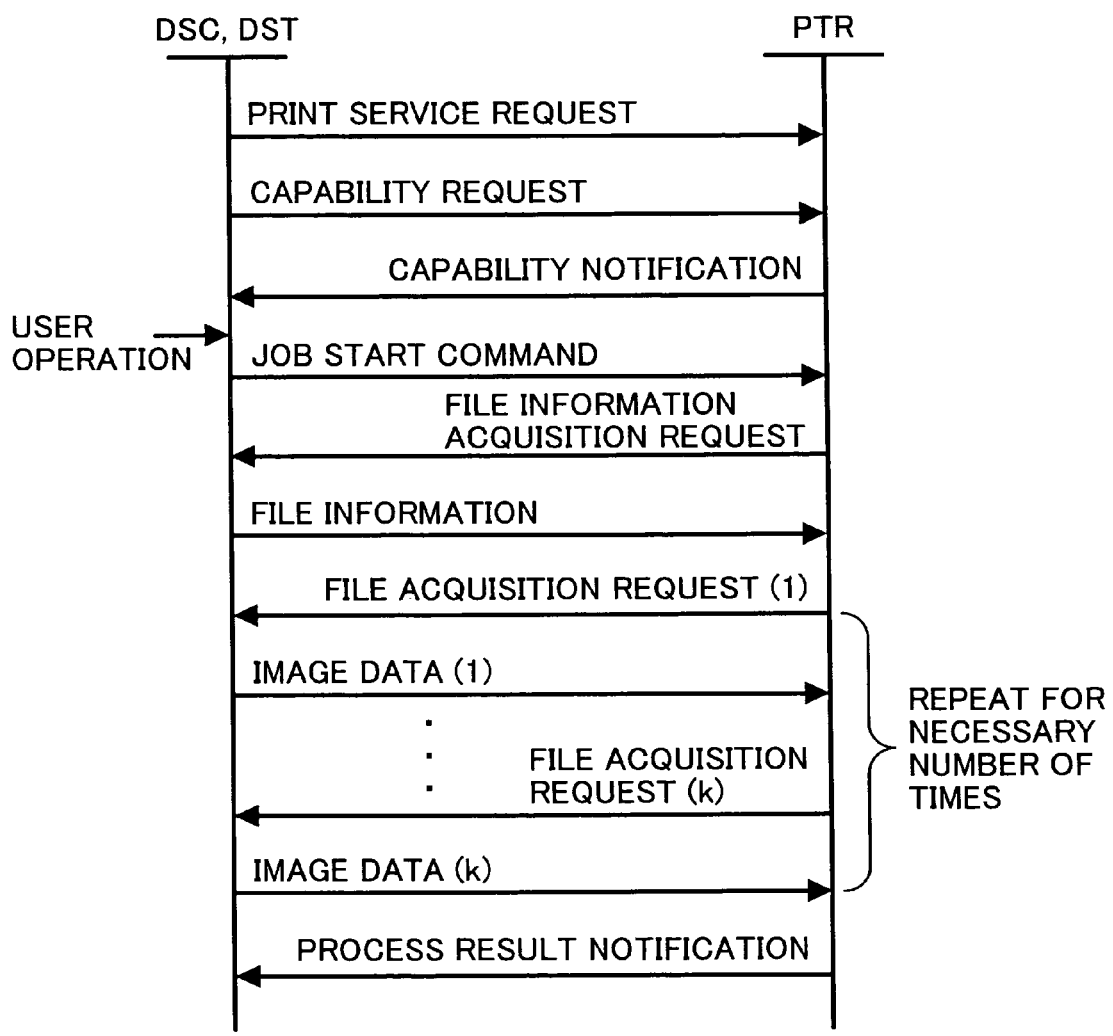
FIG. 5 is a time chart of a communication procedure when the digital still camera device DSC or the image storage device DST instructs the printing apparatus PTR to print an image.

FIG. 5 illustrates one example of a communication procedure when the digital still camera device DSC or the image storage device DST instructs the printing apparatus PTR to print an image. First, the user connects the digital still camera device DSC or the image storage device DST to the printing apparatus PTR by a USB cable, and instructs the digital still camera device DSC or the image storage device DST to print an image.

Accordingly, the digital still camera device DSC or the image storage device DST sends a command "print service request" to the printing apparatus PTR, then sends a command "capability request" to the printing apparatus PTR.

Upon reception of the command "capability request", the printing apparatus PTR sends a response "capability notification" including capability information designative with a local terminal at the time of printing.

The capability information includes an output quality (fast/normal/high image quality, or the like), a paper size, a receivable image format, a date output, and the number of intensive images. The "number of intensive images" is the number of designative frames (images) when an intensive layout or the image layout for arranging a plurality of images on a single sheet of paper is selected.

Accordingly, the digital still camera device DSC or the image storage device DST allows the user to input the print conditions (the output quality, the paper size, presence or absence of a date output, the number of intensive images, an instruction of index printing, etc.), and select images to be printed according to the capability information from the printing apparatus PTR.

Figure 6A:
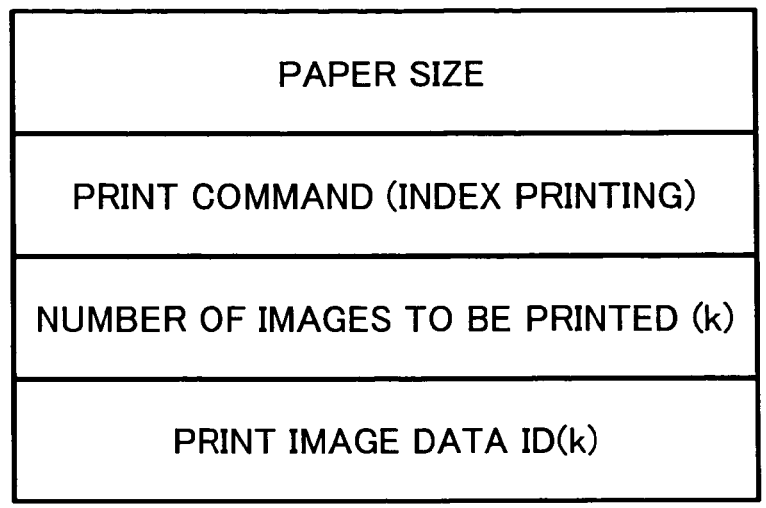
FIG. 6A is a schematic diagram for illustrating print job information.
Figure 6B:
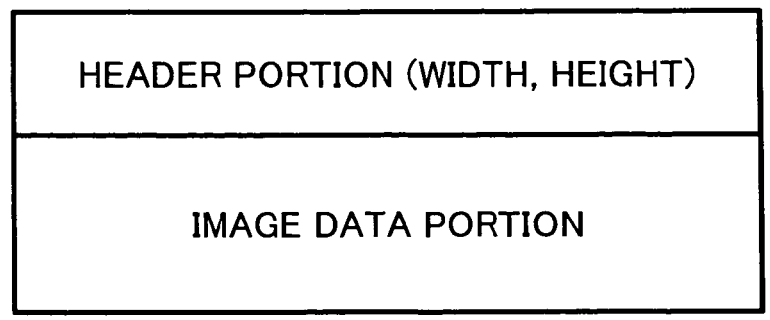
FIG. 6B is a schematic diagram for illustrating an image data format.

When the user operation is finished, the digital still camera device DSC or the image storage device DST sends the printing apparatus PTR a command "start job" including print job information as shown in FIG. 6A. When "index printing" is designated by the user, "index printing" is placed as a print command. The print job information includes the paper size designated by the user, the number of images (print image number (k)) designated by the user for index printing, and k print image data IDs for respectively identifying the images designated by the user for index printing. When all the images are automatically selected in index printing, the value of the print image number (k) is set to the number of total images stored in the digital still camera device DSC or the image storage device DST at that time, and all the print image data IDs respectively identifying the total images are set.

The printing apparatus PTR sequentially designates one or more print image data IDs included in the received print job information, and sends one or more responses "request file acquisition" to the digital still camera device DSC or the image storage device DST.

Accordingly, the digital still camera device DSC or the image storage device DST sends pieces of image data with the designated print image data IDs to the printing apparatus PTR one after another.

Based on the received image data, the printing apparatus PTR forms index printing data, and adequately performs a print operation as needed. Since the received image data is encoded by some image format, the image data is decoded to create image data of an RGB format, and the RGB format image data is converted to print data. An image to be printed is adequately magnified according to the relationship between the size of image data (the resolution and the number of pixels) and the size of print paper or the size of a print area.

When the entire print operation is finished, the result is sent as a response "notify process result" to the digital still camera device DSC or the image storage device DST.

The digital still camera device DSC or the image storage device DST ends the print job upon reception of the response "notify process result" from the printing apparatus PTR.

An index layout information table storing layout modes of images to be printed according to the paper size and the paper orientation, which are used in index printing, is saved in the printing apparatus PTR. One example of the index layout information table is shown in FIG. 7.

One element of the index layout information table includes the paper size, the number of vertical frames, the number of horizontal frames, and the paper orientation.

Figure 8A:
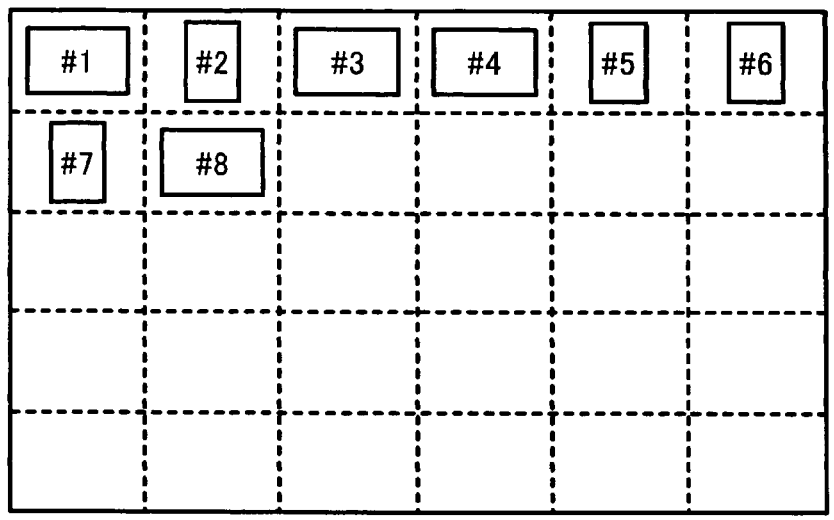
FIGS. 8A and 8B are schematic diagrams for illustrating an image layout mode.
Figure 8B:
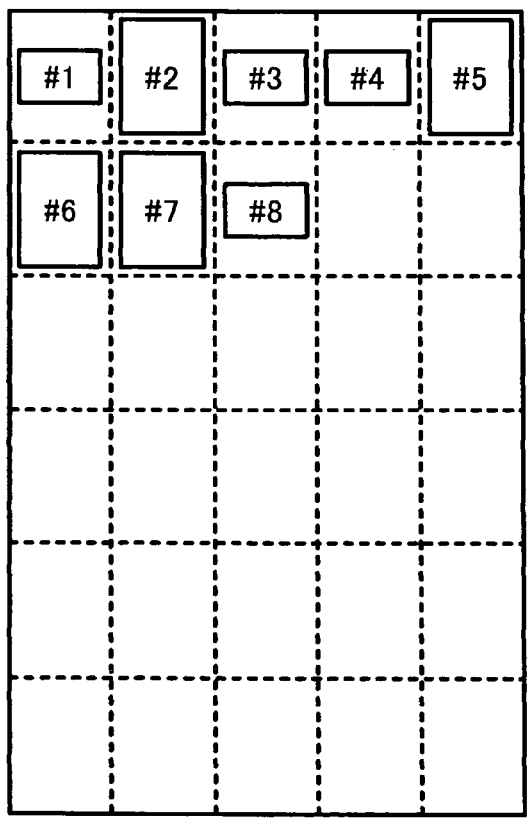

When the paper size is "A4" and the paper orientation is "horizontal", for example, the number of vertical frames is "5" and the number of horizontal frames is "6", so that the image layout mode is as shown in FIG. 8A. When the paper size is "A4" and the paper orientation is "vertical", the number of vertical frames is "6" and the number of horizontal frames is "5", so that the image layout mode is as shown in FIG. 8B.

An adequately magnified image is laid out in an associated image layout area (area where an image of one frame is laid out) while the relationship between the vertical and horizontal sizes of image data is maintained. Such an image layout mode is adapted because in the index printing mode, images are normally printed without trimming or rotation. The images are laid out leftward in order with the upper left corner as the origin, and the image layout areas move down to a next row when the rightmost image layout area is used.

When index printing is designated by the digital still camera device DSC or the image storage device DST, therefore, a tray storing sheets of paper of the designated size is selected from the multi-tier paper feeding unit 28. When there are more than one tray storing sheets of paper of the designated size, a tray whose paper orientation is horizontal is selected by priority.

A page layout in the same direction as the paper orientation of the selected tray is set, and a frame memory corresponding to the page layout is secured in the page buffer memory 26.

The number of vertical frames and the number of horizontal frames are acquired from the index layout information table based on the set paper size and paper orientation of the tray, and a plurality of areas for laying out print data are set in the frame memory.

The printing apparatus PTR sequentially converts image data received from the digital still camera device DSC or the image storage device DST to print data, and saves the print data in the associated areas of the frame memory.

When the multi-tier paper feeding unit 28 has no tray storing the sheets of paper of the designated size, a guidance message (paper setting request guidance message) is displayed to prompt the user to set horizontal sheets of paper of the designated size. In this case, in association with the horizontal orientation of the designated paper size, the number of vertical frames and the number of horizontal frames are acquired from the index layout information table, and a plurality of areas to lay out print data are set in the frame memory. In this case, in the print process of the print unit 27, after confirmation of the setting of the sheets of paper of the designated size, a tray on which the sheets of paper are set is selected and a print operation is performed.

Thus, according to the embodiment, even when the digital still camera device DSC or the image storage device DST designates only the paper size at the time or index printing, a tray storing the sheets of paper of the designated size can be selected, thereby reducing the time needed for the print process.

Figure 9:
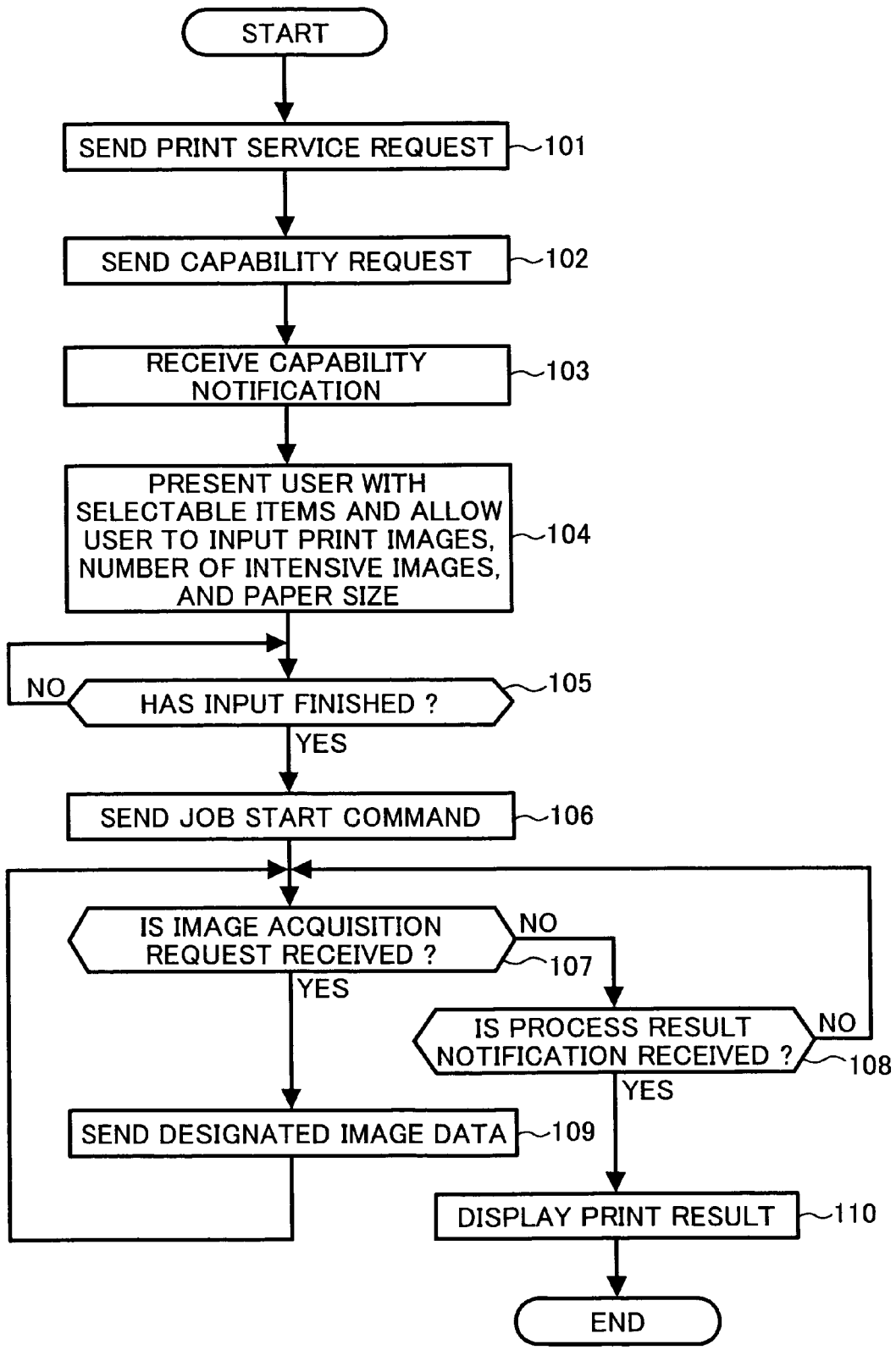
FIG. 9 is a flowchart of a process by the digital still camera device DSC (or the image storage device DST) for transferring image data to the printing apparatus PTR.

FIG. 9 is a flowchart of a process when the digital still camera device DSC (or the image storage device DST) communicates with the printing apparatus PTR and transfers image data to be printed.

First, the user connects the digital still camera device DSC to the printing apparatus PTR by the USB cable, and instructs the digital still camera device DSC to print an image.

Accordingly, the digital still-camera device DSC sends a command "print service request" to the printing apparatus PTR, and then sends a command "capability request" to the printing apparatus PTR.

The digital still camera device DSC receives the response "capability notification" from the printing apparatus PTR, and allows the user to input the print conditions (the output quality, the paper size, presence or absence of a date output, the number of intensive images, index printing, etc.), and select images to be printed (step 104) according to the received response "capability notification".

When the user operation is finished (determination 105: "YES"), the digital still camera device DSC sends the command "start job" including print job information to the printing apparatus PTR (see FIG. 6A) (step 106).

Thereafter, the digital still camera device DSC stands by for reception of the response "request file acquisition" or the response "notify process result" from the printing apparatus PTR "NO" loop of determinations 107 and 108).

When the digital still camera device DSC receives the response "request file acquisition" and the result at determination 107 becomes "YES", the digital still camera device DSC reads image data with the designated print image data IDs and sends the image data to the printing apparatus PTR (step 109).

When the digital still camera device DSC receives the response "notify process result" and the result at determination 108 becomes "YES", the digital still camera device DSC displays a print result notified by the response "notify process result" (step 110), and terminates the operation.

Figure 10:
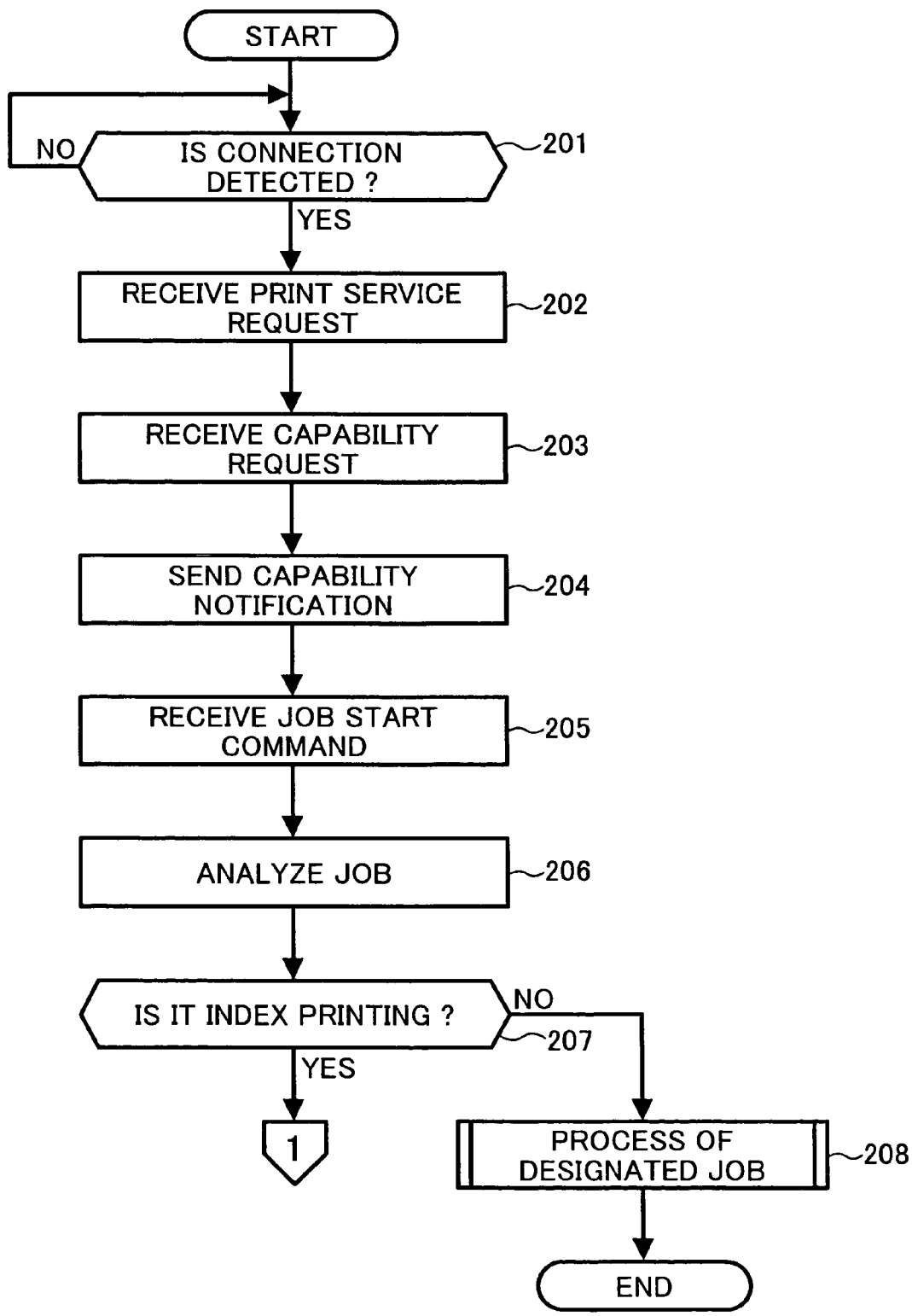
FIG. 10 is a flowchart of a process by the printing apparatus PTR for receiving a print service request from the digital still camera device DSC or the image storage device DST.
Figure 11A:
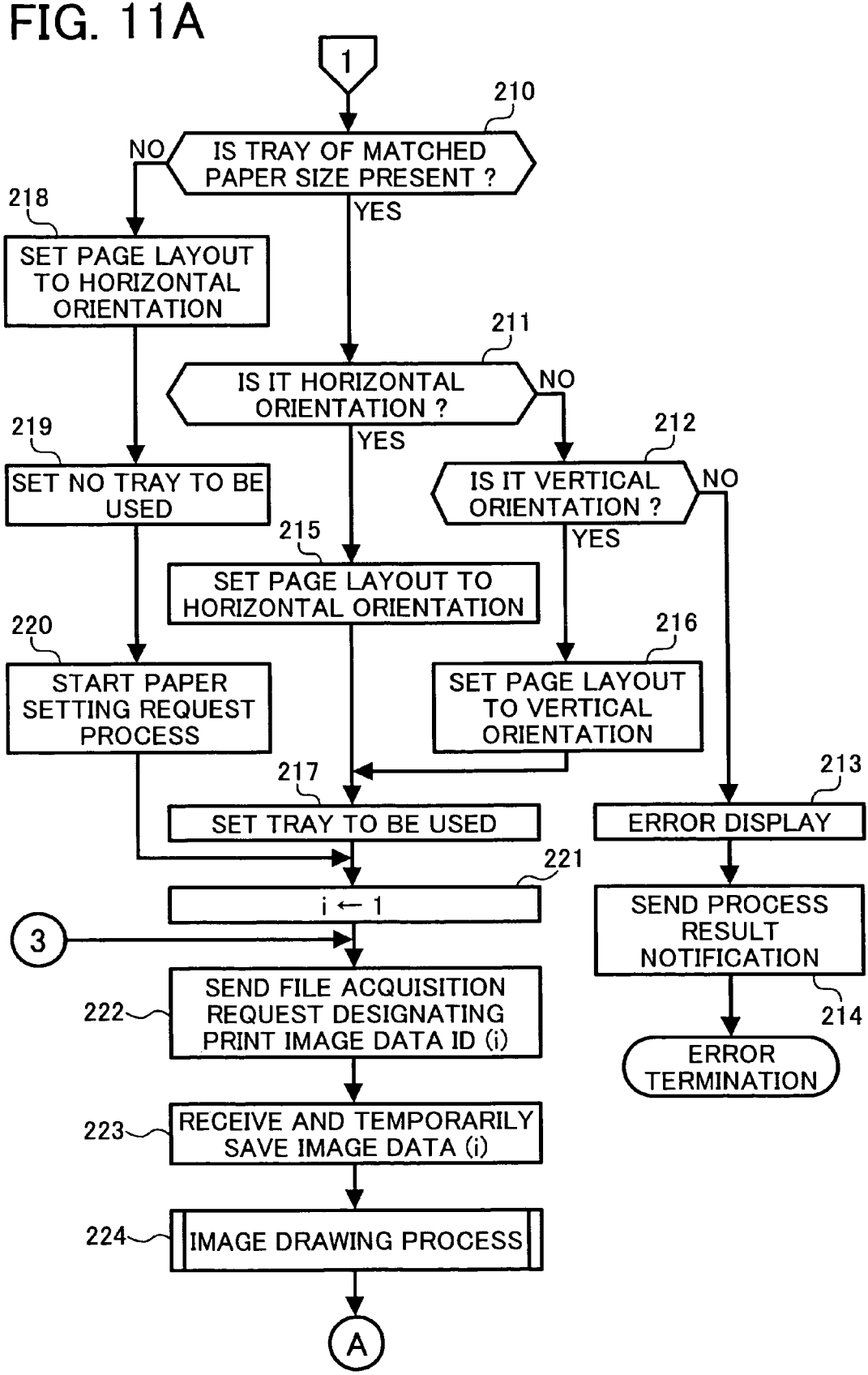
FIG. 11 is a flowchart of a process by the printing apparatus PTR for receiving the print service request from the digital still camera device DSC or the image storage device DST.
Figure 11B:
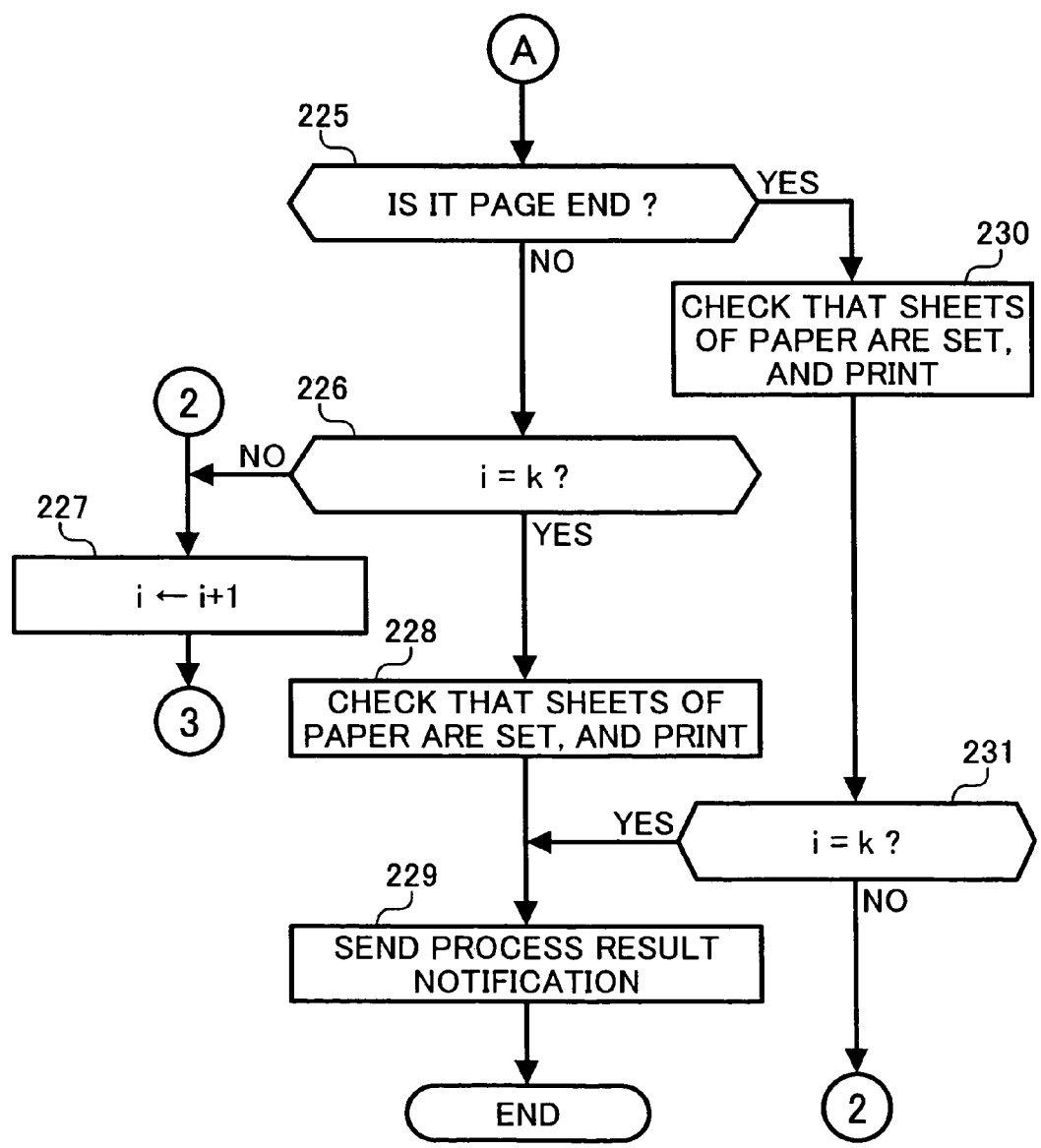

FIGS. 10 and 11 are a flowcharts of a process when the printing apparatus PTR receives a print service request from the digital still camera device DSC or the image storage device DST.

When connection of the USB cable is detected (determination 201: "YES"), the digital still camera device DSC or the image storage device DST receives the command "print service request" from the mating terminal (step 202). Thereafter, when the digital still camera device DSC or the image storage device DST receives the command "capability request" (step 203), the digital still camera device DSC or the image storage device DST sends the response "capability notification" including the capability information described above (step 204).

When receiving the command "start job" next (step 205), the digital still camera device DSC or the image storage device DST analyzes the content of the command (step 206), and checks if the content of the print command is "index printing" (determination 207).

When the result at determination 207 is "NO", the process for the designated job is performed (step 208).

When the result at determination 207 is "YES", it is checked whether the multi-tier paper feeding unit 28 has a tray storing sheets of paper of the size designated by the command "start job" (determination 210). When the result at determination 210 is "YES", it is checked whether the paper orientation is horizontal or vertical (determination 212). When the result at determination 212 is "NO", a paper error is displayed (step 213), and the response "notify process result" notifying the "print error" is sent to the mating terminal (step 214), after which an error termination of the operation is performed.

When the paper orientation is horizontal, and the result at determination 211 is "YES", the page layout of the frame memory is set to the horizontal orientation (step 215). When the paper orientation is vertical, and the result at determination 212 is "YES", the page layout of the frame memory is set to the vertical orientation (step 216).

By setting the page layout of the frame memory in this way, the tray selected then is set as a tray to be used (step 217).

When the multi-tier paper feeding unit 28 has no tray storing sheets of paper of the size designated by the command "start job", and the result at determination 210 is "NO", the page layout of the frame memory is set to the horizontal orientation (step 218). In this case, a tray to be used is not set (step 219). A paper setting request process of displaying a paper setting request guidance message to request the user to set horizontal sheets of paper of the designated size in the multi-tier paper feeding unit 28 is then started (step 220).

When determination on whether to set a tray is finished, a counter i holding the number of print images is initialized to "1" (step 221), and the response "request file acquisition" designating the i-th print image data ID (i) is sent to the mating terminal (step 222).

As the mating terminal sends the i-th image data (i), the image data (i) is received and temporarily saved (step 223). Print data corresponding to the temporarily saved image data is then written in an associated area in the frame memory secured in the page buffer memory 26 (image drawing process; step 224).

It is determined whether print data of one page of images for index printing is written in the frame memory (determination 225). When the result at determination 225 is "NO", it is checked whether the value of the counter i is equal to the print image number k (determination 226).

When the result at determination 226 is "NO", the value of the counter i is incremented by "1" to store the print data in the remaining image areas of the page under process (step 227), and the flow returns to step 222. When the result at determination 226 is "YES", if a tray is set, the use of the tray is designated to the print unit 27 to execute a print operation. If no tray is set, after detecting that horizontal sheets of paper of the size whose setting has been requested at step 220 are set in any one of the trays, the use of that tray is designated to the print unit 27 to execute a print operation (step 228). Accordingly, the printing apparatus PTR records and outputs one page of an index printout.

Since printing of all image data is finished at this time, information representing the print result is generated and included in the response "notify process result", which is then sent to the mating terminal (step 229).

When the result at determination 225 is "YES", if a tray is set, the use of the tray is designated to the print unit 27 to execute a print operation. If no tray is set, after detecting that horizontal sheets of paper of the size whose setting has been requested at step 220 are set in any one of the trays, the use of that tray is designated to the print unit 27 to execute a print operation (step 230). Accordingly, the printing apparatus PTR records and outputs one page of an index printout.

It is then checked if the value of the counter i is equal to the print image number k (determination 231). When the result at determination 231 is "NO", the flow proceeds to step 227 and the value of the counter i is incremented by "1" to execute a print operation for the next page, then subsequent processes are executed.

When the result at determination 231 is "YES", the flow proceeds to step 229 at which information representing the print result is generated and included in the response "notify process result", which is then sent to the mating terminal.

Thus, according to the embodiment, when index printing is designated, since sheets of paper stored in the trays of the multi-tier paper feeding unit 28 are adequately selected and an index printout is recorded and output, it is very convenient.

When there is a tray storing sheets of paper of the designated size at the time of tray selection, since sheets of paper whose paper orientation is horizontal or vertical are selected, it is possible to adequately record and output an index printout of the designated paper size.

When there is no tray storing sheets of paper of the designated size, a tray storing sheets of paper set as default is selected. Therefore, even when there are no sheets of paper of the designated size, an index printout can be recorded and output.

In the embodiment, although a digital still camera device or an image storage device is adapted as an external device which supplies image data to a printing apparatus connected thereto, other devices having functions similar to those of the digital still camera device and the image storage device can be used as external devices.

According to the embodiments described above, it is possible to obtain output function with high convenience and high visibility without being limited to a layout of an orientation of a transfer medium.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A digital-image printing system comprising:
   an external device configured to store digital image data; and
   a printing apparatus configured to print the digital image data received from the external device on paper, wherein
   the external device is configured to transmit information on a paper size, an index print command, and at least one piece of digital image data to the printing apparatus,
   the printing apparatus includes:
   a paper feeding unit that includes a plurality of trays, each storing sheets of paper in a vertical orientation or in a horizontal orientation;
   an index layout table that stores a plurality of image layout modes corresponding to combinations of paper sizes and horizontal and vertical orientations of paper, the image layout mode being information on an arrangement of an image on the paper;
   a receiving unit configured to receive the information on the paper size, the index print command, and the at least one piece of digital image data from the external device;

a selecting unit configured to select one of the trays corresponding to the paper size in the received information;

a determining unit configured to determine whether an orientation of the paper being stored in the selected tray is horizontal or vertical;

an acquiring unit configured to acquire, from the index layout table, an image layout mode corresponding to a combination of the paper size in the received information and the orientation of the paper determined by the determining unit; and the printing apparatus is configured to output, when the receiving unit receives the index print command, an index image that arranges an image in the received digital image data on the paper from the selected tray, based on the acquired layout mode, wherein the selecting unit is configured to select, when the paper feeding unit has no tray storing paper of the paper size in the received information, a tray in which paper of a predetermined size is stored, the determining unit is configured to determine whether an orientation of the paper having the predetermined size and being stored in the selected tray is horizontal or vertical and to set a page layout to the determined orientation when the paper feeding unit has no tray storing paper of a size designated in the received information, and the acquiring unit is configured to acquire an image layout mode corresponding to a combination of the predetermined size and the orientation of the paper having the predetermined size and being stored in the selected tray.

2. The digital-image printing system according to claim 1, wherein the image layout mode includes information on a number of frames in a direction corresponding to one side of the paper and a number of frames in a direction corresponding to the other side of the paper, the frames arranged on a single page.

3. The digital-image printing system according to claim 1, wherein the determining unit is further configured to set, when the paper feeding unit has no tray storing paper of the paper size in the received information, a page layout to the horizontal orientation and to determine to display a guidance message to prompt a user to set horizontally-oriented paper of the paper size designated in the received information, and the selecting unit is further configured to select one of the trays storing the horizontally-oriented paper of the size designated in the received information that have been set by the user.

4. The digital-image printing system according to claim 1, wherein the selecting unit is further configured to preferentially select a tray whose paper orientation is horizontal when the paper feeding unit has two or more trays storing paper of the paper size in the received information.

5. A printing apparatus that has a function of communicating data with an external device connected thereto, and that prints image data received from the external device, the printing apparatus comprising:

a paper feeding unit that includes a plurality of trays, each storing sheets of paper in a vertical orientation or in a horizontal orientation;

an index layout table that stores a plurality of image layout modes corresponding to combinations of paper sizes and horizontal and vertical orientations of paper, the image layout mode being information on an arrangement of an image on the paper;

a receiving unit configured to receive information on paper size, an index print command, and at least one piece of digital image data from the external device;

a selecting unit configured to select one of the trays corresponding to the paper size in the received information;

a determining unit configured to determine whether an orientation of the paper being stored in the selected tray is horizontal or vertical;

an acquiring unit configured to acquire, from the index layout table, an image layout mode corresponding to a combination of the paper size in the received information and the orientation of the paper determined by the determining unit; and the printing apparatus is configured to output, when the receiving unit receives the index print command, an index image that arranges an image in the received digital image data on the paper from the selected tray, based on the acquired layout mode, wherein the selecting unit is configured to select, when the paper feeding unit has no tray storing paper of the paper size in the received information, a tray in which paper of a predetermined size is stored, the determining unit is configured to determine whether an orientation of the paper having the predetermined size and being stored in the selected tray is horizontal or vertical and to set a page layout to the determined orientation when the paper feeding unit has no tray storing paper of a size designated in the received information, and the acquiring unit is configured to acquire an image layout mode corresponding to a combination of the predetermined size and the orientation of the paper having the predetermined size and being stored in the selected tray.

6. The printing apparatus according to claim 5, wherein the image layout mode includes information on a number of frames in a direction corresponding to one side of the paper and a number of frames in a direction corresponding to the other side of the paper, the frames arranged on a single page.

7. A control method of a digital-image printing system in which an external device configured to store digital image data is connected to a printing apparatus that prints the digital image data received from the external device on paper, the external device and the printing apparatus communicating data therebetween, the control method comprising:

transmitting information on a paper size, an index print command, and at least one piece of digital image data from the external device to the printing apparatus;

storing sheets of paper in a vertical or horizontal orientation in a plurality of trays;

storing an index layout table that stores a plurality of image layout modes corresponding to combinations of paper sizes and vertical and horizontal orientations of paper, the image layout mode being information on an arrangement of an image on the paper;

receiving the information on paper size, the index print command, and the at least one piece of digital image data from the external device with the printing apparatus;

selecting one of the trays corresponding to the paper size in the received information;

determining whether an orientation of the paper being stored in the selected tray is horizontal or vertical;

acquiring, from the index layout table, an image layout mode corresponding to a combination of the paper size in the received information and the orientation of the paper determined by the determining unit; and outputting, when the index print command is received, an index image that arranges an image in the received digital image data on the paper from the selected tray, based on the acquired layout mode, wherein the selecting includes selecting, when no tray storing paper of the paper size in the received information is present, a tray in which paper of a predetermined size is stored, the determining includes determining whether an orientation of the paper having the predetermined size and being stored in the selected tray is horizontal or vertical, and setting a page layout to the determined orientation when the paper feeding unit has no tray storing paper of a size designated in the received information, the acquiring includes acquiring an image layout mode corresponding to a combination of the predetermined size and the orientation of the paper having the predetermined size and being stored in the selected tray.

8. The control method according to claim 7, wherein the image layout mode includes information on a number of frames in a direction corresponding to one side of the paper and a number of frames in a direction corresponding to the other side of the paper, the frames arranged on a single page.

9. A non-transitory computer-readable recording medium that stores therein a computer program for realizing a control method of a digital-image printing system in which an external device configured to store digital image data is connected to a printing apparatus that prints the digital image data received from the external device on paper, the external device and the printing apparatus communicating data therebetween, the computer program making a computer execute:

causing the external device to transmit information on a paper size, an index print command, and at least one piece of digital image data to the printing apparatus;

storing an index layout table that stores a plurality of image layout modes corresponding to paper sizes and vertical and horizontal orientations of paper, the image layout mode being information on an arrangement of an image on the paper;

causing the printing apparatus to receive the information on the paper size, the index print command, and the at least one piece of digital image data;

selecting one of the trays corresponding to the paper size in the received information;

determining whether an orientation of the paper being stored in the selected tray is horizontal or vertical;

acquiring, from the index layout table, an image layout mode corresponding to a combination of the paper size in the received information and the orientation of the paper determined by the determining unit; and causing the printing apparatus to output, when receiving the index print command, an index image that arranges an image in the received digital image data on the paper from the selected tray, based on the acquired layout mode, wherein the selecting includes selecting, when no tray storing paper of the paper size in the received information is present in the printing apparatus, a tray in which paper of a predetermined size is stored, the determining includes determining whether an orientation of the paper having the predetermined size and being stored in the selected tray is horizontal or vertical and setting a page layout to the determined orientation when the paper feeding unit has no tray storing paper of a size designated in the received information, and the acquiring includes acquiring an image layout mode corresponding to a combination of the predetermined size and the orientation of the paper having the predetermined size and being stored in the selected tray.

10. The non-transitory computer-readable recording medium according to claim 9, wherein the image layout mode includes information on a number of frames in a direction corresponding to one side of the paper and a number of frames in a direction corresponding to the other side of the paper, the frames arranged on a single page.

* * * * *

UNITED STATES PATENT AND TRADEMARK OFFICE
CERTIFICATE OF CORRECTION

| | | |
|---|---|---|
| PATENT NO. | : 8,368,940 B2 | Page 1 of 1 |
| APPLICATION NO. | : 11/340698 | |
| DATED | : February 5, 2013 | |
| INVENTOR(S) | : Toda et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1295 days.

Signed and Sealed this
Twenty-fourth Day of February, 2015

Michelle K. Lee
*Deputy Director of the United States Patent and Trademark Office*